United States Patent [19]
Ito et al.

[11] 3,930,972

[45] Jan. 6, 1976

[54] PROCESS FOR PREPARING THERMALLY STABILIZED OXYMETHYLENE POLYMER FROM TRIOXANE WITH THIOCYANATE AND RADIATION

[75] Inventors: Akihiko Ito; Masaru Yoshida; Yoshiaki Nakase; Tadafumi Yamauchi, all of Takasaki; Tadashi Iwai, Ube; Koichiro Hayashi, Sapporo, all of Japan

[73] Assignee: Japan Atomic Energy Research Institute, Tokyo, Japan

[22] Filed: Sept. 10, 1973

[21] Appl. No.: 395,731

Related U.S. Application Data

[63] Continuation of Ser. No. 280,804, Aug. 15, 1972, abandoned.

[30] Foreign Application Priority Data

Aug. 20, 1971 Japan............................. 46-62985

[52] U.S. Cl. .................. 204/159.21; 260/67 FP
[51] Int. Cl.² .................. C08G 2/02; C08G 2/00
[58] Field of Search ............ 204/159.21; 260/67 FP

[56] References Cited
UNITED STATES PATENTS

| | | | |
|---|---|---|---|
| 3,677,922 | 7/1972 | Ito et al. | 204/159.21 |
| 3,703,454 | 11/1972 | Nakase et al. | 204/159.21 |

*Primary Examiner*—Richard B. Turer
*Attorney, Agent, or Firm*—Stevens, Davis, Miller & Mosher

[57] ABSTRACT

Trioxane can advantageously be polymerized in the presence of a thiocyanate (an ester of thiocyanic acid), to obtain an oxymethylene polymer having thermal stability. The polymerization is further promoted by means of an ionizing radiation or an ultraviolet light.

4 Claims, No Drawings

PROCESS FOR PREPARING THERMALLY STABILIZED OXYMETHYLENE POLYMER FROM TRIOXANE WITH THIOCYANATE AND RADIATION

This is a continuation of application Ser. No. 280,804, filed Aug. 15, 1972, now abandoned.

BACKGROUND OF THE INVENTION

This invention relates to a process for preparing an oxymethylene polymer having good thermal stability, comprising polymerization of trioxane in the presence of a thiocyanate (an ester of thiocyanic acid), and an oxymethylene polymer obtained by the process. In a preferable embodiment of the present invention, the thermal stability of the polymer can be further improved when an acetal, an oxathiolane, an oxathiane or an organic acid anhydride coexists with a thiocyanate, in the above polymerization. Irradiation with a light beam or radiation before and/or during the polymerization results in advantageous effect.

It has been well known that polyoxymethylene is obtained by polymerizing formaldehyde or trioxane (a cyclic trimer of formaldehyde). It has been also well known that a cationic catalyst such as general Lewis acid and its complex, or a radiation is applied in the above polymerization process. However, the polymer obtained in the above process has poor chemical and thermal stabilities, and is easily depolymerized to form formaldehyde. Therefore in order to make the above polymer suitable for practical use, further treatments to increase its stability must be applied. For instance, a technique is known, in which the ends of polyoxymethylene molecules are acetylated with acetic acid anhydride. On the other hand, another technique is also well known, in which a copolymer is obtained by adding a second component which is copolymerizable with formaldehyde or trioxane. However, no process has been known for the polymerization of formaldehyde or trioxane in the presence of ester of thiocyanic acid. The use of alkyl-acetal as a chain transfer agent is well known in the polymerization of trioxane in the presence of a cationic catalyst (V. Jaacks et al. Makromal. Chem. 83, 56, 1965; Japanese Pat. No. 21638/1966 and others), and furthermore, it is known that the polymerization of trioxane, in the presence of a cyclic acetal, results in a copolymer (S. Rosinger et al. T. Polym. Sci. A-1, 5, 183, 1967; Japanese Pat. No. 3836/1969 and others), or that trioxane is copolymerized with a cyclic sulfur compound (Japanese Pat. No. 7631/1967).

However, the polymerization mentioned above has disadvantages — that is, unpractical polymerization conditions, use of very reactive catalyst and the like. Although it is known that an aliphatic carboxylic acid anhydride can coexist in radiation polymerization of trioxane (Japanese Pat. No. 26594/1963), the acid anhydride, in this case, only acts to increase the polymerizable ability of trioxane.

SUMMARY OF THE INVENTION

The object of the present invention is to provide a process to obtain an oxymethylene polymer having good thermal stability in one process, by polymerizing trioxane coexisting with an ester of thiocyanic acid in the presence or absence of an acetal, an oxathiolane, an oxathiane or an organic acid anhydride. Another object is to provide an oxymethylene polymer having good thermal stability. The irradiation prior to and/or in the course of the above polymerization leads to better results. The present invention is characterized by the use of an ester of thiocyanic acid which results in polymer with practical utility.

To summarize the constitution of the invention, (a) the oxymethylene polymer with good thermal stability is obtained in one process by heating trioxane coexisting with ester of thiocyanic acid: (b) Irradiation prior to and/or in the course of the polymerization improves the polymerization rate and thermal stability: (c) when the above polymerization is carried out in the presence of at least one or more of acetal, oxathiolane, oxathiane and saturated aliphatic carboxylic acid anhydride, the polymerization rate and thermal stability are further improved.

Combination of trioxane and a thiocyanate in the present invention exhibits a specific effect on initiating polymerization and thermal stability of the resulting polymer. Such specific effect can not be observed in a combination of the other organic sulfur compound and trioxane.

The ester of thiocyanic acid herein used includes those which are expressed by the general formula, R-SCN, where R means an aliphatic, a cycloaliphatic or an aromatic group. Typical examples of the above thiocyanates are methyl-, ethyl-, propyl-, isopropyl-, butyl-, isobutyl-, amyl-, isoamyl-, benzyl-, phenyl-thiocyanates and the like. For acetal, typical examples of acyclic acetal include dimethoxymethane (methylal), diethoxyethane (ethylal), 1,1-dimethoxyethane, 1,1-diethoxyethane and the like, and those of cyclic acetal include 1,3-dioxolane, 1,3-dioxane, 1,3-dioxepane, 1,3-dioxecane, 1,3,5-trioxepane, 1,4,6-trioxecane, 4-methyloxolane and the like. Typical examples of oxathiolane and oxathiane are 1,3-oxathiolane, 3-oxo-1,2-oxathiolane, 1,3-oxathian, 2,2-dimethyl-1,3-oxathian, 1,4-oxathian, 1,4-oxathiene, benzo-1,4-oxathiadiene, 1,4-benzoxathiene and the like. Typical examples of saturated aliphatic carboxylic acid anhydride are acetic, propionic, butyric, benzoic, succinic anhydride and the like. UV-light from mercury lamp is effectively used as light beam and usable radiations include $\alpha$-, $\beta$-, $\gamma$-rays, electron beam, X-rays, neutron beam, heavy particles beam and mixtures thereof.

DESCRIPTION OF THE PREFERRED EMBODIMENTS

A typical embodiment of the polymerization process is as follows. An ester of thiocyanic acid is added to trioxane. When the additive might evaporate from the polymerization system because of its high vapor pressure, sealing of the system is desirable. The method of addition in the case of solid phase polymerization involves addition of an ester of thiocyanic acid to crystalline trioxane in the form of droplet, spray or gas, and that trioxane is solidified after addition followed by melting and mixing. When the polymerization is carried out in a liquid phase, either process, direct addition into liquid trioxane or making trioxane to a liquid phase after addition into its crystals, can be used.

The amount of ester of thiocyanic acid to be added is in the range of about 0.01 – 15 weight %, preferably about 0.1 – 5 weight % by weight of trioxane. When the ester of thiocyanic acid is contained in the system in low concentration or in the form of solid at room temperature, the ester is dissolved in a solvent such as n-hexane, benzene, cyclohexane or the like which is inactive to the ester and formaldehyde, and the solution can be applied. Furthermore, when acetal, oxathiolane, oxathiane and acid anhydride are used in the system, at least one of these additives is applied simultaneously with the ester or in accordance with the manner mentioned above. These additives are generally employed in a quantity of not more than about 15% by weight of trioxane. A light or radiation is applied in the following various ways: irradiating the system after the additive is applied to trioxane, applying the additive after irradiating trioxane, irradiating trioxane followed by application of the additive in the process of polymerization under heating, individual irradiation of trioxane and an ester of thiocyanic acid followed by mixing of these materials, and irradiating an ester of thiocyanic acid followed by addition to trioxane, and furthermore, any combination of these methods can be applied.

The dose of radiation applied is usually in the range of about $10^2 - 10^8$ rad, and the dose rate for in-source polymerization is in the range of about $10^2 - 10^8$ rad/hr. The temperature during irradiation is the same as that of polymerization, for in-source polymerization, and is allowed to be a temperature at which trioxane is kept in the form of crystal, for post polymerization. When the irradiation is carried out at a temperature above 10°C, in-source polymerization is in progress except for the case of very short period of irradiation, and if necessary, the polymerization can be continued by post polymerization. The preferable polymerization temperature is in the range of about 30°– 140°C.

In solid phase polymerization, better result can be obtained. "Solid phase polymerization" herein used means the polymerization in which trioxane exists in the form of solid (containing dispersoid) and "liquid phase polymerization" means the polymerization in which the system containing trioxane comprises a liquid phase. In some cases, the polymerization proceeds even in the course of raising the temperature of a heating bath above the melting point of trioxane. After the polymerization, unreacted materials are removed from the system by washing the polymerized product with a suitable solvent for trioxane and an additive such as acetone, benzene, methanol and the like. The polymer produced was always white crystallines with a melting point in the range of about 160°– 180°C, and its viscosity number $[\eta]$ was measured at 60°C after the polymer was dissolved in p-chlorophenol containing 2% of $\alpha$-pinene. Moreover, the thermal stability of the polymer is expressed by the average thermal decomposition rate, $K_{222}$ (%/min.), at which the polymer is pyrolyzed at 222°C for 1 hr in a stream of nitrogen gas. The "%" in the following examples means weight %, unless otherwise specified. In the examples, gamma rays from Co-60 were employed.

EXAMPLE 1

One (1)g of crystalline trioxane purified by sublimation was put in a glass ampoule and the ampoule was sealed after addition of methyl thiocyanate, ethyl thiocyanate or benzyl thiocyanate. Then, the polymerization was carried out in a heating bath at 55°C. After the polymerization, the additive was completely removed by washing the polymerized product using acetone and the product was dried under a reduced pressure for 24 hrs. Conditions and results of the polymerization are shown in Table 1.

TABLE 1

| Polymerization Condition | | | | Result | | |
|---|---|---|---|---|---|---|
| Ester of Thiocyanic Acid | | Radiation Dose | Polymerization Time (hr) | Yield (%) | $K_{222}$ | $[\eta]$ |
| Methyl Thiocyanate | 0.1 % | $10^6$ rad (−78°C) | 2 | 38 | 0.45 | 1.4 |
| Methyl Thiocyanate | 1.0 | — | 4 | 20 | 0.50 | 1.8 |
| Methyl Thiocyanate | 1.0 | $2 \times 10^6$ | 2 | 60 | 0.40 | 2.0 |
| Methyl Thiocyanate | 5.0 | $10^6$ | 6 | 75 | 0.48 | 3.3 |
| Ethyl Thiocyanate | 0.5 | $2 \times 10^6$ | 1 | 55 | 0.47 | 1.9 |
| Ethyl Thiocyanate | 2.0 | $2 \times 10^6$ | 1 | 67 | 0.46 | 2.2 |
| Ethyl Thiocyanate | 3.0 | $10^7$ | 1 | 81 | 0.30 | 1.2 |
| Ethyl Thiocyanate | 5.0 | $10^6$ | 1 | 46 | 0.44 | 2.1 |
| Benzyl Thiocyanate | 1.0 | $10^6$ | 6 | 59 | 0.52 | 2.6 |

EXAMPLE 2

The polymerization was carried out in a similar way to Example 1 except that 3.0% of ethyl thiocyanate was added and the sample was irradiated with the radiation dose of $4 \times 10^6$ rad (−78°C) after sealing and was polymerized in a heating bath at various temperatures. The time for polymerization was 1 hr. The results of polymerization are given in Table 2.

TABLE 2

| Temperature of heating bath | Yield | $K_{222}$ | $[\eta]$ |
|---|---|---|---|
| 50°C | 35 % | 0.63 | 2.1 |
| 55 | 71 | 0.33 | 2.0 |
| 60 | 63 | 0.43 | 1.7 |
| 80* | 46 | 0.58 | 1.1 |

(*liquid phase polymerization)

EXAMPLE 3

One (1)g of trioxane was put in a glass ampoule and 3.0% of ethyl thiocyanate was added. After sealing, the sample was irradiated with the radiation dose of $10^6$ rad (−78°C) and was polymerized in a heating bath at 55°C for 4 hrs. Polymer was obtained with the yield of 59%, $K_{222}$ value of 0.43 and $[\eta] = 1.8$. In the polymerization only with irradiation, without addition of ethyl thiocyanate, polymer was obtained with the yield of 55%, $K_{222}$ value of 1.32 and $[\eta] = 1.9$.

EXAMPLE 4

One (1)g of trioxane was put in a glass ampoule and was irradiated with the radiation dose of $4 \times 10^6$ rad (−78°C). Then, it was polymerized in a heating bath at 55°C, during which 3.0% of ethyl thiocyanate was added at various periods. After polymerization, the sample was treated in a similar way to that in Example 1. Conditions and results of polymerization are shown in Table 3.

Table 3

| Period of addition of ethyl thiocyanate (after the initiation of heating) | Polymerization time after addition (hr) | Yield (%) | $K_{222}$ | $[\eta]$ |
|---|---|---|---|---|
| 0 (hr) | 4 | 53 | 0.46 | 2.1 |
| 2 (hr) | 2 | 74 | 0.49 | 2.1 |
| 19 (hr) | 2 | 72 | 0.40 | 1.9 |

EXAMPLE 5

One (1)g of trioxane was put in a glass ampoule and 3.0% of ethyl thiocyanate and 0.5% or 1.0% of 1,3-oxathiolane were added. After sealing, the sample was irradiated with the radiation dose of $2 \times 10^6$ rad ($-78°C$). Then, it was polymerized for 8 hours in a heating bath at 55°C. After the polymerization, the sample was treated in a similar way to that in Example 1. The yields of the polymer were 72% and 65% for 0.5% and 1.0% of the amounts of oxathiolane added, $K_{222}$ values of 0.32 and 0.29, and $[\eta]$ values of 1.8 and 1.7 respectively. Without addition of oxathiolane, the above values were 65%, 0.38 and 2.1 respectively.

EXAMPLE 6

One (1)g of trioxane, purified by means of recrystalization from a methylene chloride solution, was put in a glass ampoule and a combination of an ester of thiocyanic acid with acetal or acid anhydride, as shown in Table 4, was added. After sealing, the sample was irradiated with the radiation dose of $1 \times 10^6$ rad ($-78°C$), then it was polymerized in a heating bath at 55°C for 6 hrs. Conditions and results of the polymerization are shown in Table 4.

Table 4

| Ester of Thiocyanic Acid | | Acetal or Acid Anhydride | | Yield | $K_{222}$ | $[\eta]$ |
|---|---|---|---|---|---|---|
| Methyl Thiocyanate | 3.0% | Methylal | 1.0% | 79% | 0.36 | 1.7 |
| Methyl Thiocyanate | 3.0% | Propionic Anhydride | 0.05% | 78% | 0.46 | 2.4 |
| Ethyl Thiocyanate | 3.0% | Propionic Anhydride | 1.0% | 82% | 0.27 | 1.9 |
| Benzyl Thiocyanate | 1.0% | Dioxolane | 3.0% | 65% | 0.44 | 2.2 |
| Example | — | Methylal | 1.0% | 48% | 0.92 | 1.5 |
| for | — | Propionic Anhydride | 1.0% | 37% | 0.83 | 1.2 |
| Comparison | — | Dioxolane | 3.0% | 35% | 0.70 | 1.5 |

The main effects of the present invention are summarized hereinafter. A concomitant use of an ester of thiocyanic acid and acetal, oxathiolane, oxathiane or acid anhydride accelerates polymerization velocity. On the other hand, trioxane is considered to be polymerized by means of radiation or light even in a liquid phase, because the polymerization reaction is accelerated by them in a liquid phase. In the system in the absence of an ester of thiocyanic acid, the above polymerization does not proceed, and therefore, the mechanism of the polymerization claimed in the present invention is considered to be different from the radiation polymerization generally well known. However, solid phase polymerization, at temperature below the melting point of trioxane, brings better results. Moreover, the polymer is produced with no or little deformation of the monomeric trioxane and it is easy to deal with the reactant because the load on the polymerizing stirrer is not varied during the process. It is not necessary to neutralize the reaction system after polymerization, because no highly reactive substance (catalyst) such as cationic catalyst is used in the process. The use of ester of thiocyanic acid and third component in excess results in a lower yield of the polymer, especially in solid phase polymerization. Therefore, additive in the amount of less than about 5% is preferable from the view point of yield. The liquid phase polymerization is not so restricted as mentioned above.

What we claim is:

1. A process for preparing an oxymethylene polymer comprising
    mixing trioxane with about 0.01 to 15 per cent by weight based on the weight of said trioxane of a thiocyanate and
    carrying out polymerization by keeping the mixture at a temperature in the range of from about 30° to about 140°C,
    said polymerization being initiated and promoted by irradiating said mixture with an ionizing radiation at a dose rate of about $10^2 - 10^8$ rad/hr and for a total dose of about $10^2 - 10^8$ rad.

2. A process of claim 1, in which said thiocyanate is represented by the formula R-SCN wherein R is selected from an aliphatic, a cycloaliphatic and an aromatic groups.

3. A process of claim 1, in which the polymerization is conducted in solid phase.

4. A process of claim 1, in which at least one additive selected from the group consisting of a cyclic acetal, an acyclic acetal, an oxathiolane, an oxathiane and an organic carboxylic acid anhydride is concomitantly employed in a quantity of not more than 15% by weight of trioxane.

* * * * *